United States Patent
Frischhut et al.

(10) Patent No.: US 12,509,790 B2
(45) Date of Patent: Dec. 30, 2025

(54) COMPOSITION FOR TIN OR TIN ALLOY ELECTROPLATING COMPRISING LEVELING AGENT

(71) Applicant: BASF SE, Ludwigshafen (DE)

(72) Inventors: Sabine Frischhut, Ludwigshafen (DE); Soichi Watanabe, Ludwigshafen (DE); Alexander Fluegel, Ludwigshafen (DE); Marco Arnold, Ludwigshafen (DE); Jan Niclas Gorges, Bobenheim-Roxheim (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/256,972

(22) PCT Filed: Dec. 15, 2021

(86) PCT No.: PCT/EP2021/086006
§ 371 (c)(1),
(2) Date: Jun. 12, 2023

(87) PCT Pub. No.: WO2022/129238
PCT Pub. Date: Jun. 23, 2022

(65) Prior Publication Data
US 2024/0052515 A1  Feb. 15, 2024

(30) Foreign Application Priority Data
Dec. 18, 2020 (EP) .................... 20215809

(51) Int. Cl.
*C25D 3/60* (2006.01)
*C25D 3/32* (2006.01)

(52) U.S. Cl.
CPC ............. *C25D 3/60* (2013.01); *C25D 3/32* (2013.01)

(58) Field of Classification Search
None
See application file for complete search history.

(56) References Cited

U.S. PATENT DOCUMENTS

| | | | |
|---|---|---|---|
| 3,361,652 A | 1/1968 | Joachim et al. | |
| 4,000,047 A | 12/1976 | Ostrow et al. | |
| 4,582,576 A | 4/1986 | Opaskar et al. | |
| 4,871,429 A | 10/1989 | Nobel et al. | |
| 5,174,887 A | 12/1992 | Federman et al. | |
| 7,628,903 B1 | 12/2009 | Tsuji et al. | |
| 7,781,325 B2 | 8/2010 | Lee et al. | |
| 8,980,077 B2 | 3/2015 | Romer et al. | |
| 2006/0094226 A1 | 5/2006 | Huang et al. | |
| 2008/0054459 A1 | 3/2008 | Lee et al. | |
| 2008/0296761 A1 | 12/2008 | Lee et al. | |
| 2014/0183050 A1 | 7/2014 | Okada et al. | |

FOREIGN PATENT DOCUMENTS

| | | | |
|---|---|---|---|
| EP | 0854206 A1 | 7/1998 | |
| JP | H10-25595 A | 1/1998 | |
| JP | 4296358 B2 | 7/2009 | |
| WO | 2007/110337 A1 | 10/2007 | |
| WO | 2010069810 A1 | 6/2010 | |
| WO | WO-2018219848 A1 * | 12/2018 | ............... C25D 3/32 |
| WO | 2019185468 A1 | 10/2019 | |
| WO | 2021052817 A1 | 3/2021 | |

OTHER PUBLICATIONS

O'Neill et al. Tetrahedron Letters 39 '1998' 6065-6068 (Year: 1998).*
Lemhadri et al. SYNLETT 2006, No. 18, pp. 2935-2940 (Year: 2006).*
Unterhalt et al. Arch. Pharm. 'Weinheim' 311, 604-608 '1978' (Year: 1978).*
Machine translation of Unterhalt et al. Arch. Pharm. 'Weinheim' 311, 604-608 '1978' (Year: 1978).*
European Search Report for EP Patent Application No. 20215809.3, Issued on Jun. 4, 2021, 3 pages.
Zhang, et al., "Cyclohexane 1, 3-diones and their inhibition of mutant SOD1-dependent protein aggregation and toxicity in PC12 cells", Bioorganic & medicinal chemistry, vol. 20, Issue 2, Jan. 15, 2012, pp. 1029-1045.
International Search Report and Written Opinion for corresponding PCT/EP2021/086006, mailed May 3, 2022, 16 pages.

* cited by examiner

*Primary Examiner* — Wojciech Haske
(74) *Attorney, Agent, or Firm* — Armstrong Teasdale LLP

(57) ABSTRACT

Disclosed herein is an aqueous composition including tin ions, optionally alloy metal ions selected from the group consisting of silver, indium, and bismuth ions and at least one additive of formula L1a

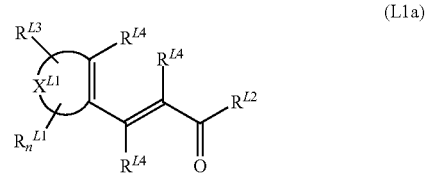

or of formula L1b

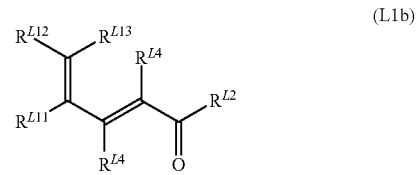

19 Claims, No Drawings

COMPOSITION FOR TIN OR TIN ALLOY ELECTROPLATING COMPRISING LEVELING AGENT

CROSS-REFERENCE TO RELATED APPLICATIONS

This application is a U.S. National Phase Application of International Patent Application No. PCT/EP2021/086006, filed Dec. 15, 2021, which claims priority to European Patent Application No. 20215809.3, filed Dec. 18, 2020, each of which is hereby incorporated by reference herein.

BACKGROUND OF THE INVENTION

The invention relates to tin or tin alloy electroplating compositions comprising a leveling agent, their use and processes for tin or tin alloy electroplating.

Metals and metal-alloys are commercially important, particularly in the electronics industry where they are often used as electrical contacts, final finishes and solders. Lead-free solders, such as tin, tin-silver, tin-copper, tin-bismuth, tin-silver-copper, and others, are common metals used in solders. These solders are often deposited on semiconductor substrates by means of metal electroplating plating baths.

A typical tin plating solution comprises dissolved tin ions, water, an acid electrolyte such as methanesulfonic acid in an amount sufficient to impart conductivity to the bath, an antioxidant, and proprietary additives to improve the uniformity of the plating and the quality of the metal deposit in terms of surface roughness and void formation. Such additives usually include surfactants and grain refiners, among others.

Certain applications for lead-free solder plating present challenges in the electronics industry. For example, when used as a capping layer on copper pillars, a relatively small amount of lead-free solder, such as tin-silver solder, is deposited on top of a copper pillar. In plating such small amounts of solder, it is often difficult to plate a uniform height of solder composition on top of each pillar, both within a die and across the wafer. The use of known solder electroplating baths also often results in deposits having a relatively rough surface morphology.

U.S. Pat. No. 3,361,652 discloses an acidic tin electroplating composition comprising primary brightener of the formula X—CH=CH—Y, in which X is phenyl, furfuryl, or pyridyl and Y may be hydrogen, formyl, carboxyl, alkyl, hydroxyalkyl, formylalkyl, or the acyl radical of a carboxylic acid. One of the mentioned brighteners is benzylideneacetone (benzalacetone).

In a preferred embodiment, U.S. Pat. No. 4,582,576 discloses an acidic tin electroplating composition comprising a carbonyl compound of the following formula

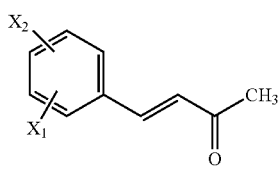

wherein $X_1$ and $X_2$ may be hydrogen, hydroxyl, alkoxy, chlorine or bromine, and the alkyl group of the alkoxy group may contain from about 1 to about 5 carbon atoms. Examples of such compounds include benzylidene acetone (bezalacetone) and 3'-chlorobenzylidine acetone.

U.S. 2014/183 050 A1 discloses a tin or tin alloy electroplating liquid which is suitable for via filling which deposits tin or a tin alloy selectively in a via, and a method for via filling using the liquid, which can form a column-like deposit which practically does not have voids. The plating liquid comprises a specific α, β-unsaturated carbonyl compound is added into the tin or tin alloy plating liquid. Such carbonyl compound may specifically be substituted by alkyl groups with 1-9 carbon atoms, alkenyl groups, alkoxy groups, amino groups, halogen atoms, hydroxyl groups, carbonyl groups, and cyano groups. 3-chloro acetophenone, crotonyl chloride, butenoyl chloride, and 4-chloro-2-butenal are mentioned.

However, the prior art does neither solve nor even address the problem to get a uniform height, both within a die and across the wafer and a better roughness of the deposited solder. Therefore, there is still a need in the electronic industry for a pure tin or tin-alloy electroplating bath which leads to solder deposit with an improved roughness Ra and a good or even better uniformity in height, also called coplanarity (COP).

It is an object of the present invention to provide a tin or tin alloy electroplating composition that provides a uniform and planar tin or tin alloy deposit, in particular in recessed features of 1 micrometer to 200 micrometer width. It is a further an object of the invention to provide a tin or tin alloy electroplating composition that has good leveling properties, in particular leveling agents capable of providing a substantially planar tin or tin alloy layer and filling features on the micrometer scale without substantially forming defects, such as but not limited to voids, with a tin or tin alloy electroplating bath.

SUMMARY OF THE INVENTION

The present invention provides an aqueous composition comprising tin ions, optionally alloy metal ions selected from silver, indium, and bismuth ions and at least one additive of formula L1a

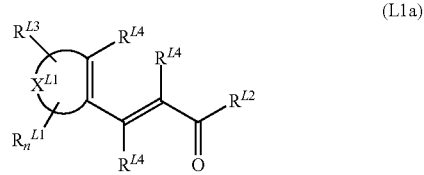

(L1a)

or of formula L1b

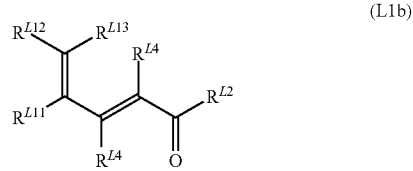

(L1b)

wherein $R^{L1}$ is, for each group $R^{L1}$n independently, selected from —F, a linear or branched $C_1$ to $C_6$ alkyl that comprises one or more F substituents in $C_1$ or $C_2$ position;

$R^{L2}$ is a $C_1$ to $C_6$ alkyl, $C_1$ to $C_6$ alkenyl, $C_5$ to $C_{12}$ aryl, $C_6$ to $C_{15}$ alkylaryl, $C_6$ to $C_{15}$ arylalkyl, all of which may be substituted by CN, OH, $C_1$ to $C_6$ alkoxy or halogen, particularly F;

$R^{L3}$ is selected from H, $C_1$ to $C_6$ alkyl, $C_1$ to $C_6$ alkenyl, $C_1$ to $C_6$ alkoxy, halogen, CN, and OH;

$R^{L4}$ is, for each $R^{L4}$ independently, selected from $R^{L1}$ and $R^{L3}$;

$R^{L11}$, $R^{L12}$, $R^{L13}$ are independently selected from $R^{L1}$ and $R^{L3}$, with the condition that at least one, preferably two, most preferably all of $R^{L11}$, $R^{L12}$, $R^{L13}$ are $R^{L1}$;

$X^{L1}$ is (a) a divalent saturated, unsaturated group selected from
(a) a $C_3$ to $C_5$ alkanediyl group,
(b) a $C_3$ to $C_5$ alkenediyl group,
or
(c) forms, together with the adjacent C=C double bond, a $C_5$ to $C_{12}$ aromatic ring system; and
n is the number of groups $R^{L1}$ selected from 1, 2 or 3.

A further embodiment of the present invention is the use of the additives as described herein in a bath for depositing tin or tin alloy containing layers, wherein the tin alloy containing layers comprise an alloy metal selected from silver, copper, indium, and bismuth in an amount of 0.01 to 10% by weight.

Yet another embodiment of the present invention is a process for depositing a tin or tin alloy layer on a substrate by
a) contacting a tin alloy electroplating bath comprising a composition as described herein with the substrate, and
b) applying an electrical current to the substrate for a time sufficient to deposit the tin or tin alloy layer onto the substrate.

The additives according to the present invention can advantageously be used in bonding technologies such as the manufacture of tin or tin alloy bumps of typically 1 to 200, preferably 3 to 100, most preferably 5 to 50 micrometers height and width for the bumping process, in circuit board technologies or in packaging processes for electronic circuits. In one particular embodiment, the substrate comprises micrometer sized features and the deposition is performed to fill the micrometer sized features, wherein the micrometer-sized features have a size from 1 to 200 micrometers, preferably 3 to 100 micrometers.

The additives according to the invention lead to tin or tin alloy, particularly tin-silver deposits that show a better roughness Ra compared to unsubstituted α,β-unsaturated carbonyl compounds or α,β-unsaturated carbonyl compounds that have a substitution other than the fluorine-containing substituents described herein. The additives according to the invention also lead to tin or tin alloy deposits that show a good or even better coplanarity (COP). Furthermore, by using the additives according to the invention the process window of the tin or tin alloy electroplating bath is extended.

DETAILED DESCRIPTION OF THE INVENTION

Additives According to the Invention

In the following, the terms "additive", "leveler", "fluorinated α,β-unsaturated carbonyl compound", and "fluorinated compound" are used herein synonymously.

In a first embodiment comprising aliphatic or aromatic cyclic fluorinated α,β-unsaturated carbonyl compounds, besides tin ions and optional alloy metal ions selected from silver, indium, and bismuth ions, the electroplating composition comprises at least one additive of formula L1a

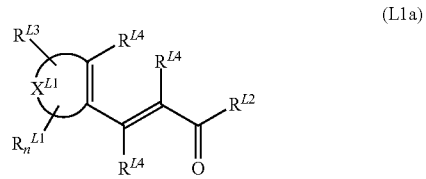

(L1a)

wherein
$R^{L1}$ is, for each group $R^{L1}$n independently, selected from —F, a linear or branched $C_1$ to $C_6$ alkyl that comprises one or more F substituents in $C_1$ or $C_2$ position;

$R^{L2}$ is a $C_1$ to $C_6$ alkyl, $C_1$ to $C_6$ alkenyl, $C_5$ to $C_{12}$ aryl, $C_6$ to $C_{15}$ alkylaryl, $C_6$ to $C_{15}$ arylalkyl, all of which may be substituted by CN, OH, $C_1$ to $C_6$ alkoxy or halogen, particularly F;

$R^{L3}$ is selected from H, $C_1$ to $C_6$ alkyl, $C_1$ to $C_6$ alkenyl, $C_1$ to $C_6$ alkoxy, halogen, CN, and OH;

$R^{L4}$ is $R^{L1}$ or $R^{L3}$;

$X^{L1}$ is
(a) a divalent group selected from
(i) a $C_3$ to $C_5$ alkanediyl,
(ii) a $C_3$ to $C_5$ alkenediyl, or
(b) forms, together with the adjacent C=C double bond, a $C_5$ to $C_{12}$ aromatic ring system; and
n is the number of groups $R^{L1}$ selected from 1, 2 or 3, preferably 1 or 2, most preferably 1.

As used herein, "alkyl" and "alkanediyl" mean a linear, branched or cyclic alkyl or alkanediyl group, respectively. As used herein, "aromatic" or "aryl" means a mono or bicyclic, carbocyclic aromatic group that may be unsubstituted (except substituents $R^{L1}$) or substituted by one or more Cl, $C_1$ to $C_6$ alkyl groups, particularly one or more $C_1$ to $C_4$ alkyl groups, more particularly one or more methyl, ethyl or propyl groups, most particularly one or two methyl or ethyl groups. As used herein, "alkenyl" and "alkenediyl" mean a linear, branched or cyclic alkenyl or alkenediyl group, respectively. As used herein, "arylalkyl" means an alkyl group that is substituted by one or more aryl groups, particularly one or more phenyl groups, most particularly one phenyl group. As used herein, "alkylaryl" means an aryl group that is substituted by one or more $C_1$ to $C_6$ alkyl groups, particularly one or more $C_1$ to $C_4$ alkyl groups, more particularly one or more methyl, ethyl or propyl groups, most particularly one or two methyl or ethyl groups. As used herein "fluorinated in $C_1$ or $C_2$ position" means that there is at least one, preferably at least two F substitutuents in the $C_1$ or in the $C_2$ position of the alkyl group. All fluorinated α,β-unsaturated carbonyl compounds may have E or Z configuration, or mixtures thereof, preferably E configuration.

Preferably $R^{L1}$ may be selected from —F, —$CR^{L30}_2F$, —$CR^{L30}F_2$, —$CF_3$, —$CFR^{L30}$—$CR^{L30}_3$, —$CF_2$—$CR^{L30}_3$, —$CF_2$—$CFR^{L30}_2$, —$CF_2$—$CF_2R^{L30}$, and —$CF_2$—$CF_3$, wherein $R^{L30}$ is selected from H and $C_1$ to $C_6$ alkyl. Particularly preferable groups $R^{L1}$ may be F or perfluorinated $C_1$ to $C_4$ alkyl, particularly —$CF_3$. Different groups $R^{L1}$ may be used for any specific substituent $R^{L1}$n, i.e. for $R^{L1}_1$, $R^{L1}_2$, and $R^{L1}_3$ if more than one substituent $R^{L1}$ is present.

Preferably $R^{L2}$ is selected from methyl, ethyl, 1-propyl, 2-propyl, tert. butyl, and benzylidene, more preferably methyl and ethyl, ethenyl, benzylidene, all of which may be unsubstituted or substituted by F, CN. Most preferred groups $R^{L2}$ may be methyl or ethyl, all of which may be unsubstituted or substituted by F. It needs to be emphasized that $R^2$ is different from $R^{L1}$.

Preferably $R^{L3}$ is selected from H, $C_1$ to $C_4$ alkyl, $C_1$ to $C_4$ alkenyl, $C_1$ to $C_4$ alkoxy, Cl, and CN, more preferably selected from H, methyl or ethyl, most preferably selected from H.

Preferably $R^{L4}$ is selected from $R^{L1}$, H, $C_1$ to $C_4$ alkyl, $C_1$ to $C_4$ alkenyl, $C_1$ to $C_4$ alkoxy, Cl, and CN, more preferably selected from H, methyl or ethyl, most preferably selected from H.

In a first preferred alternative of the first embodiment the leveler may be a cyclic aliphatic compound of formula L2a

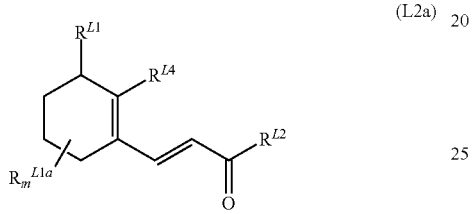
(L2a)

or of formula L2b

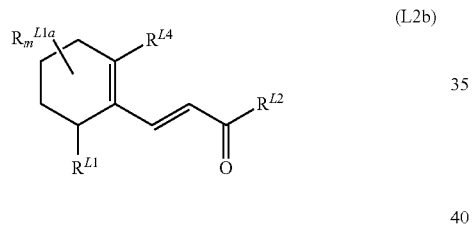
(L2b)

wherein $R^{L1a}$ is selected from $R^{L1}$, Cl, Br, and $C_1$ to $C_6$ alkyl, preferably $C_1$ to $C_3$ alkyl, which alkyl may be unsubstituted or substituted by F, CN, Cl and Br; and m is 0, 1, 2, or 3, or 4, preferably 0, 1, or 2, most preferably 0 or 1.

Particularly preferred compounds of the first alternative fluorinated α,β-unsaturated carbonyl compounds are 4-(3,6-dimethylcyclohexen-1-yl)but-3-en-2-one, 4-(3-fluoro-6-methyl-cyclohexen-1-yl)but-3-en-2-one, 4-(3,6-difluorocyclohexen-1-yl)but-3-en-2-one, 4-(6-fluoro-3-methyl-cyclohexen-1-yl)but-3-en-2-one, 4-[3-methyl-6-(trifluoromethyl)cyclohexen-1-yl]but-3-en-2-one, 4-[6-(trifluoromethyl)cyclohexen-1-yl]but-3-en-2-one, 4-[3-(trifluoromethyl)cyclohexen-1-yl]but-3-en-2-one, 4-[3,6-bis(trifluoromethyl)cyclohexen-1-yl]but-3-en-2-one, 4-(3-fluorocyclohexen-1-yl)but-3-en-2-one, 4-(6-fluorocyclohexen-1-yl)but-3-en-2-one, 4-[3-(1-fluoroethyl)cyclohexen-1-yl]but-3-en-2-one, 4-[3,6-bis(1-fluoroethyl)cyclohexen-1-yl]but-3-en-2-one, 4-[3-(2-fluoroethyl)cyclohexen-1-yl]but-3-en-2-one, and 4-[3,6-bis(2-fluoroethyl)cyclohexen-1-yl]but-3-en-2-one, and compounds of formula L2c

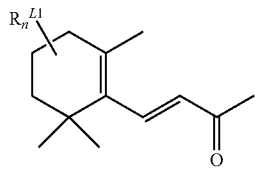

In a second preferred alternative to the first embodiment the leveler may be an aromatic compound of formula L3

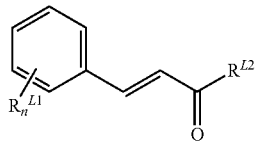
(L3)

Particularly preferred levelers of the second alternative may be a compound of formula L3a

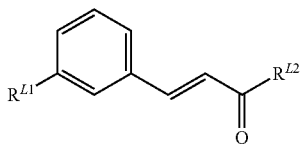
(L3a)

or of formula L3b

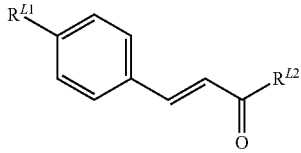
(L3b)

Even if less preferred, also ortho-substituted phenyl groups may be used. Such compounds of formula L3, L3a, and L3b may also be further substituted by $C_1$ to $C_4$ alkyl, $C_1$ to $C_4$ alkoxy, Cl, and CN.

Particularly preferred fluorinated α,β3-unsaturated carbonyl compounds of the second alternative are selected from 4-(3-fluoro phenyl)-but-3-en-2-one, 4-[3-(trifluoromethyl)phenyl]-but-3-en-2-one, 4-(4-fluorophenyl)-but-3-en-2-one, 4-[4-(trifluoromethyl)phenyl]-but-3-en-2-one, 4-(3,5-difluorophenyl)-but-3-en-2-one, 4-(3,5-bis(trifluoromethyl)phenyl)-but-3-en-2-one, 4-(2,4,6-trifluorophenyl)but-3-en-2-one, 4-[2,4,6-tris(trifluoromethyl)phenyl]but-3-en-2-one, 4-[4-(difluoromethyl)phenyl]but-3-en-2-one, 4-[3-(difluoromethyl)phenyl]but-3-en-2-one, 4-[3,5-bis(difluoromethyl)phenyl]but-3-en-2-one, 4-[4-(fluoromethyl)phenyl]but-3-en-2-one, 4-[3-(fluoromethyl)phenyl]but-3-en-2-one, 4-[3,5-bis(fluoromethyl)phenyl]but-3-en-2-one, 4-[4-(1,1,2,2,2-pentafluoroethyl)phenyl]but-3-en-2-one, 4-[3-(1,1,2,2,2-pentafluoroethyl)phenyl]but-3-en-2-one, 4-[3,5-bis(1,1,2,2,2-pentafluoroethyl)phenyl]but-3-en-2-one, 4-[4-(2,2,2-trifluoro-ethyl)phenyl]but-3-en-2-one, 4-[3-(2,2,2-trifluoroethyl)phenyl]but-3-en-2-one, 4-[3,5-bis(2,2,2-trifluoroethyl)phenyl]but-3-en-2-one, 4-(2,4-bis(trifluoromethyl)phenyl)but-3-en-2-one, (4-(4-

(trifluoromethyl)phenyl)pent-1-en-3-one, 4-(4-fluorophenyl)pent-1-en-3-one, and 1-(4-fluorophenyl)-4,4-dimethylpent-1-en-3-one.

Further preferred fluorinated α,β3-unsaturated carbonyl compounds are those comprision alkoxy or hydroxy substituents such as but not limited to 1-(2-fluoro-5-methoxyphenyl)-4,4-dimethyl-pent-1-en-3-one, 1-(2-fluoro-5-methoxyphenyl)-4-methylpent-1-en-3-one, 4-(4-fluoro-3-methoxyphenyl)but-3-en-2-one, 4-(3-fluoro-4-methoxyphenyl)but-3-en-2-one, 1-(2-fluoro-5-methoxyphenyl)pent-1-en-3-one, 4-(2-fluoro-4-methoxyphenyl)but-3-en-2-one, 4-(5-fluoro-2-methoxyphenyl)but-3-en-2-one, 4-(2-fluoro-5-methoxyphenyl)but-3-en-2-one, 4-(3-fluoro-2-methoxyphenyl)but-3-en-2-one, 4-(2-fluoro-6-methoxyphenyl)but-3-en-2-one, 4-(3-fluoro-5-methoxyphenyl)but-3-en-2-one, 4-(2-fluoro-3-methoxyphenyl)but-3-en-2-one, and 4-(4-fluoro-2-hydroxyphenyl)but-3-en-2-one.

In a second embodiment comprising aliphatic linear or branched fluorinated α,β-unsaturated carbonyl compound, besides tin ions and optional alloy metal ions selected from silver, indium, and bismuth ions, the electroplating composition comprises at least one additive of formula L1b

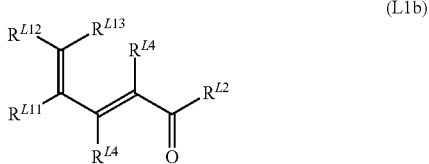

wherein $R^{L11}$, $R^{L12}$, $R^{L13}$ are independently selected from $R^{L1}$ and $R^{L2}$, with the condition that at least one, preferably two, most preferably all of $R^{L11}$, $R^{L12}$, $R^{L13}$ are $R^{L1}$;

$R^{L1}$ is, for each group $R^{L1}$n independently, selected from F or a linear or branched $C_1$ or $C_2$ fluorinated $C_1$ to $C_6$ alkyl;

$R^{L2}$ is a $C_1$ to $C_6$ alkyl, $C_1$ to $C_6$ alkenyl, $C_5$ to $C_{12}$ aryl, $C_6$ to $C_{15}$ alkylaryl, $C_6$ to $C_{15}$ arylalkyl, all of which may be substituted by CN, OH, $C_1$ to $C_6$ alkoxy or halogen, particularly F;

$R^{L3}$ is selected from H, $C_1$ to $C_6$ alkyl, $C_1$ to $C_6$ alkenyl, $C_1$ to $C_6$ alkoxy, halogen, CN, and OH;

$R^{L4}$ is, for each $R^{L4}$ independently, selected from $R^{L1}$ and $R^{L3}$.

The additives according to the present invention may be prepared by any preparation method. A preferred process for preparation fluorinated phenyl α,β-unsaturated carbonyl compound is by Wittig reaction of the respective substituted benzaldehyde with e.g triphenylphosphonium ylide derivative as described in Bioorganic & Medicinal Chemistry, 2012, 20(2), 1029-1045.

In the process of preparing the α,β-unsaturated carbonyl compounds, it is possible to use further compounds, e.g. in order to introduce specific substituents into the leveler, to set defined properties or to make further reactions on the resulting leveler at a later point in time possible. The composition as describe herein may further comprise an additive selected from one or more surfactants and one or more grain refiners different from the fluorinated α,β-unsaturated carbonyl compounds described above.

Further Levelers

It will be appreciated by those skilled in the art that more than one leveling agent may be used. When two or more leveling agents are used, at least one of the leveling agents is a fluorinated α,β-unsaturated carbonyl compound or a derivative thereof as described herein. It is preferred to use only one or more fluorinated α,β-unsaturated carbonyl compound as leveling agents in the plating bath composition.

Suitable additional leveling agents include, but are not limited to, polyaminoamide and derivatives thereof, polyalkanolamine and derivatives thereof, polyethylene imine and derivatives thereof, quaternized polyethylene imine, polyglycine, poly(allylamine), polyaniline, polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole, polyvinylpyrrolidone, or copolymers thereof, nigrosines, pentamethyl-para-rosaniline hydrohalide, hexamethyl-pararosaniline hydrohalide, or compounds containing a functional group of the formula N-R-S, where R is a substituted alkyl, unsubstituted alkyl, substituted aryl or unsubstituted aryl. Typically, the alkyl groups are $C_1$-$C_6$ alkyl and preferably $C_1$-$C_4$ alkyl. In general, the aryl groups include $C_6$-$C_{20}$ aryl, preferably $C_6$-$C_{12}$ aryl. Such aryl groups may further include heteroatoms, such as sulfur, nitrogen and oxygen. It is preferred that the aryl group is phenyl or napthyl. The compounds containing a functional group of the formula N-R-S are generally known, are generally commercially available and may be used without further purification.

In such compounds containing the N-R-S functional group, the sulfur ("S") and/or the nitrogen ("N") may be attached to the rest of the molecule with single or double bonds. When the sulfur is attached rest of the molecule with a single bond, the sulfur will have another substituent group, such as but not limited to hydrogen, $C_1$-$C_{12}$ alkyl, $C_2$-$C_{12}$ alkenyl, $C_6$-$C_{20}$ aryl, $C_1$-$C_{12}$ alkylthio, $C_2$-$C_{12}$ alkenylthio, $C_6$-$C_{20}$ arylthio and the like. Likewise, the nitrogen will have one or more substituent groups, such as but not limited to hydrogen, $C_1$-$C_{12}$ alkyl, $C_2$-$C_{12}$ alkenyl, $C_7$-$C_{10}$ aryl, and the like. The N-R-S functional group may be acyclic or cyclic. Compounds containing cyclic N-R-S functional groups include those having either the nitrogen or the sulfur or both the nitrogen and the sulfur within the ring system.

Further leveling agents are triethanolamine condensates as described in unpublished international Patent Application No. PCT/EP2009/066581.

In general, the total amount of leveling agents in the electroplating bath is from 0.5 ppm to 10000 ppm based on the total weight of the plating bath. The leveling agents according to the present invention are typically used in a total amount of from about 100 ppm to about 10000 ppm based on the total weight of the plating bath, although greater or lesser amounts may be used.

A large variety of additives may typically be used in the bath to provide desired surface finishes for the plated tin or tin alloy bump. Usually more than one additive is used with each additive forming a desired function. Advantageously, the electroplating baths may contain one or more of surfactants, grain refiners, complexing agents in case of alloy deposition, antioxidants, and mixtures thereof. Most preferably the electroplating bath comprises a surfactant and optionally a grain refiner in addition to the leveling agent according to the present invention. Other additives may also be suitably used in the present electroplating baths.

Surfactants

One or more nonionic surfactants may be used in the present compositions. Typically, the nonionic surfactants have an average molecular weight from 200 to 100,000, preferably from 500 to 50,000, more preferably from 500 to 25,000, and yet more preferably from 750 to 15,000. Such nonionic surfactants are typically present in the electrolyte compositions in a concentration from 1 to 10,000 ppm, based on the weight of the composition, and preferably from 5 to 10,000 ppm. Preferred alkylene oxide compounds include polyalkylene glycols, such as but not limited to alkylene oxide addition products of an organic compound having at least one hydroxy group and 20 carbon atoms or less and tetrafunctional polyethers derived from the addition of different alkylene oxides to low molecular weight polyamine compounds.

Preferred polyalkylene glycols are polyethylene glycol and polypropylene glycol. Such polyalkylene glycols are generally commercially available from a variety of sources and may be used without further purification. Capped polyalkylene glycols where one or more of the terminal hydrogens are replaced with a hydrocarbyl group may also be suitably used. Examples of suitable polyalkylene glycols are those of the formula R—O—(CXYCX'Y'O)$_n$R' where R and R' are independently chosen from H, $C_2$-$C_{20}$ alkyl group and $C_6$-$C_{20}$ aryl group; each of X, Y, X' and Y' is independently selected from hydrogen, alkyl such as methyl, ethyl or propyl, aryl such as phenyl, or aralkyl such as benzyl; and n is an integer from 5 to 100,000. Typically, one or more of X, Y, X' and Y' is hydrogen.

Suitable EO/PO copolymers generally have a weight ratio of EO:PO of from 10:90 to 90:10, and preferably from 10:90 to 80:20. Such EO/PO copolymers preferably have an average molecular weight of from 750 to 15,000. Such EO/PO copolymers are available from a variety of sources, such as those available from BASF under the tradename "PLURONIC".

Suitable alkylene oxide condensation products of an organic compound having at least one hydroxy group and 20 carbon atoms or less include those having an aliphatic hydrocarbon from one to seven carbon atoms, an unsubstituted aromatic compound or an alkylated aromatic compound having six carbons or less in the alkyl moiety, such as those disclosed in U.S. Pat. No. 5,174,887. The aliphatic alcohols may be saturated or unsaturated. Suitable aromatic compounds are those having up to two aromatic rings. The aromatic alcohols have up to 20 carbon atoms prior to derivatization with ethylene oxide. Such aliphatic and aromatic alcohols may be further substituted, such as with sulfate or sulfonate groups.

Grain Refiners

The tin or tin alloy electroplating bath may further contain grain refiners that are different from the levelers according to the invention. Grain refiners may be chosen from a compound of formula G1 or G2

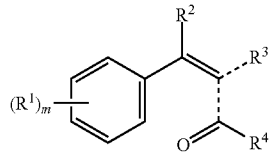
(G1)

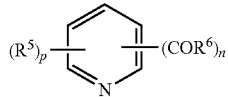
(G2)

wherein each $R^1$ is independently $C_1$ to $C_6$ alkyl, $C_1$ to $C_6$ alkoxy, hydroxy, or halogen; $R^2$ and $R^3$ are independently selected from H and $C_1$ to $C_6$ alkyl; $R^4$ is H, OH, $C_1$ to $C_6$ alkyl or $C_1$ to $C_6$ alkoxy; m is an integer from 0 to 2; each $R^5$ is independently $C_1$ to $C_6$ alkyl; each $R^6$ is independently chosen from H, OH, $C_1$ to $C_6$ alkyl, or $C_1$ $C_6$ alkoxy; n is 1 or 2; and p is 0, 1 or 2.

Preferably, each $R^1$ is independently $C_1$ to $C_6$ alkyl, $C_1$ to C3 alkoxy, or hydroxy, and more preferably $C_1$ to $C_4$ alkyl, $C_1$ to $C_2$ alkoxy, or hydroxy. It is preferred that $R^2$ and $R^3$ are independently chosen from H and $C_1$ to $C_3$ alkyl, and more preferably H and methyl. Preferably, $R^4$ is H, OH, $C^1$ to $C^4$ alkyl or $C_1$ to $C_4$ alkoxy, and more preferably H, OH, or $C_1$ to $C_4$ alkyl. It is preferred that $R^5$ is $C_1$ to $C_4$ alkyl, and more preferably $C_1$ to $C_3$ alkyl. Each $R^6$ is preferably chosen from H, OH, or C1 to $C_6$ alkyl, more preferably H, OH, or $C_1$ to $C_3$ alkyl, and yet more preferably H or OH. It is preferred that m is 0 or 1, and more preferably m is 0. Preferably, n is 1. It is preferred that p is 0 or 1, and more preferably p is 0. A mixture of first grain refiners may be used, such as two different grain refiners of formula 1, 2 different grain refiners of formula 2, or a mixture of a grain refiner of formula 1 and a grain refiner of formula 2.

Exemplary compounds useful as such grain refiners include, but are not limited to, cinnamic acid, cinnamaldehyde, benzylidene acetone, picolinic acid, pyridinedicarboxylic acid, pyridinecarboxaldehyde, pyridinedicarboxaldehyde, or mixtures thereof. Preferred grain refiners include benzalacetone, 4-methoxy benzaldehyde, benzylpyridin-3-carboxylate, and 1,10-phenantroline.

Further grain refiners may be chosen from an α,β-unsaturated aliphatic carbonyl compound. Suitable α,β-unsaturated aliphatic carbonyl compound include, but are not limited to, α,β-unsaturated carboxylic acids, α,β-unsaturated carboxylic acid esters, α,β-unsaturated amides, and α,β-unsaturated aldehydes. Preferably, such grain refiners are chosen from α,β-unsaturated carboxylic acids, α,β-unsaturated carboxylic acid esters, and α,β-unsaturated aldehydes, and more preferably α,β-unsaturated carboxylic acids, and α,β-unsaturated aldehydes. Exemplary α,β-unsaturated aliphatic carbonyl compounds include (meth) acrylic acid, crotonic acid, C to C6 alkyl meth)acrylate, (meth)acrylamide, $C_1$ to $C_6$ alkyl crotonate, crotonamide, crotonaldehyde,(meth)acrolein, or mixtures thereof. Preferred α,β-unsaturated aliphatic carbonyl compounds are (meth)acrylic acid, crotonic acid, crotonaldehyde, (meth) acrylaldehyde or mixtures thereof.

Grain refiners may be present in the plating baths of the invention in an amount of 0.0001 to 0.045 g/l. Preferably, the grain refiners are present in an amount of 0.0001 to 0.04 g/l, more preferably in an amount of 0.0001 to 0.035 g/l, and yet more preferably from 0.0001 to 0.03 g/l. Compounds useful as the first grain refiners are generally commercially available from a variety of sources and may be used as is or may be further purified.

The present compositions may optionally include further additives, such as antioxidants, organic solvents, complexing agents, and mixtures thereof. While additional levelers may be used in the present plating baths, it is preferred that the plating baths comprise only the levelers according to the present invention.

Antioxidants

Antioxidants may optionally be added to the present composition to assist in keeping the tin in a soluble, divalent state. It is preferred that one or more antioxidants are used in the present compositions. Exemplary antioxidants include, but are not limited to, hydroquinone, and hydroxylated and/or alkoxylated aromatic compounds, including sulfonic acid derivatives of such aromatic compounds, and preferably are: hydroquinone; methylhydroquinone; resorcinol; catechol; 1,2,3-trihydroxybenzene; 1,2-dihydroxybenzene-4-sulfonic acid; 1,2-dihydroxy-benzene-3, 5-disulfonic acid; 1,4-dihydroxybenzene-2-sulfonic acid; 1,4-dihydroxybenzene-2, 5-disulfonic acid; 2,4-dihyroxybenzene sulfonic acid, and p-Methoxyphenol. Such antioxidants are disclosed in U.S. Pat. No. 4,871,429. Other suitable antioxidants or reducing agents include, but are not limited to, vanadium compounds, such as vanadylacetylacetonate, vanadium triacetylacetonate, vanadium halides, vanadium oxyhalides, vanadium alkoxides and vanadyl alkoxides. The concentration of such reducing agent is well known to those skilled in the art, but is typically in the range of from 0.1 to 10 g/l, and preferably from 1 to 5 g/l. Such antioxidants are generally commercially available from a variety of sources. It is particularly preferred to use the prescribed antioxidants in pure tin electroplating compositions.

Complexing Agents

The tin or tin alloy electroplating bath may further contain complexing agents for complexing tin and/or any other metal present in the composition. A typical complexing agent is 3,6-Dithia-1,8-octanediol. Further useful complexing agents are described in WO 2019/185 468 and unpublished international patent application No. PCT/EP2020/075 080.

Typical complexing agents are polyoxy monocarboxylic acids, polycarboxylic acids, aminocarboxylic acids, lactone compounds, and salts therof.

Other complexing agents are organic thiocompounds like thiourea, thiols or thioethers as disclosed in U.S. 7,628,903, JP 4296358 B2, EP 0854206 A and U.S. Pat. No. 8,980,077 B2.

Electrolyte

In general, as used herein "aqueous" means that the present electroplating compositions comprises a solvent comprising at least 50% of water. Preferably, "aqueous" means that the major part of the composition is water, more preferably 90% of the solvent is water, most preferably the solvent essentially consists of water. Any type of water may be used, such as distilled, deionized or tap.

Tin

The tin ion source may be any compound capable of releasing metal ions to be deposited in the electroplating bath in sufficient amount, i.e is at least partially soluble in the electroplating bath. It is preferred that the metal ion source is soluble in the plating bath. Suitable metal ion sources are metal salts and include, but are not limited to, metal sulfates, metal halides, metal acetates, metal nitrates, metal fluoroborates, metal alkylsulfonates, metal arylsulfonates, metal sulfamates, metal gluconates and the like.

The metal ion source may be used in the present invention in any amount that provides sufficient metal ions for electroplating on a substrate. When the metal is solely tin, the tin salt is typically present in an amount in the range of from about 1 to about 300 g/l of plating solution.

Alloying Metals

Optionally, the plating baths according to the invention may contain one or more alloying metal ions. Suitable alloying metals include, without limitation, silver, gold, copper, bismuth, indium, zinc, antimony, manganese and mixtures thereof. Preferred alloying metals are silver, copper, bismuth, indium, and mixtures thereof, and more preferably silver. It is preferred that the present compositions are free of lead. Any bath-soluble salt of the alloying metal may suitably be used as the source of alloying metal ions. Examples of such alloying metal salts include, but are not limited to: metal oxides; metal halides; metal fluoroborate; metal sulfates; metal alkanesulfonates such as metal methanesulfonate, metal ethanesulfonate and metal propanesulfonate; metal arylsulfonates such as metal phenylsulfonate, metal toluenesulfonate, and metal phenolsulfonate; metal carboxylates such as metal gluconate and metal acetate; and the like. Preferred alloying metal salts are metal sulfates; metal alkanesulfonates; and metal arylsulfonates. When one alloying metal is added to the present compositions, a binary alloy deposit is achieved. When 2, 3 or more different alloying metals are added to the present compositions, tertiary, quaternary or higher order alloy deposits are achieved. The amount of such alloying metal used in the present compositions will depend upon the particular tin-alloy desired. The selection of such amounts of alloying metals is within the ability of those skilled in the art. It will be appreciated by those skilled in the art that when certain alloying metals, such as silver, are used, an additional complexing agent may be required. Such complexing agents (or complexers) are well-known in the art and may be used in any suitable amount.

The present electroplating compositions are suitable for depositing a tin-containing layer, which may be a pure tin layer or a tin-alloy layer. Exemplary tin-alloy layers include, without limitation, tin-silver, tin-copper, tin-indium, tin-bismuth, tin-silver-copper, tin-silver-copper-antimony, tin-silver-copper-manganese, tin-silver-bismuth, tin-silver-indium, tin-silver-zinc-copper, and tin-silver-indium-bismuth. Preferably, the present electroplating compositions deposit pure tin, tin-silver, tin-silver-copper, tin-silver-bismuth, tin-silver-indium, and tin-silver-indium-bismuth, and more preferably pure tin, tin-silver or tin-copper.

Alloys deposited from the present electroplating bath contain an amount of tin ranging from 0.01 to 99.99 wt %, and an amount of one or more alloying metals ranging from 99.99 to 0.01 wt %, based on the weight of the alloy, as measured by either atomic adsorption spectroscopy (AAS), X-ray fluorescence (XRF), inductively coupled plasma (ICP) or differential scanning calorimetry (DSC). Preferably, the tin-silver alloys deposited using the present invention contain from 90 to 99.99 wt % tin and 0.01 to 10 wt % of silver and any other alloying metal. More preferably, the tin-silver alloy deposits contain from 95 to 99.9 wt % tin and 0.1 to 5 wt % of silver and any other alloying metal. Tin-silver alloy is the preferred tin-alloy deposit, and preferably contains from 90 to 99.9 wt % tin and from 10 to 0.1 wt % silver. More preferably, the tin-silver alloy deposits contain from 95 to 99.9 wt % tin and from 5 to 0.1 wt % silver. For many applications, the eutectic composition of an alloy may be used. Alloys deposited according to the present invention are substantially free of lead, that is, they contain 1 wt % lead, more preferably below 0.5 wt %, and yet more preferably below 0.2 wt %, and still more preferably are free of lead.

Bath

In general, besides the metal ion source and at least one of the leveling agents according to the invention the present metal electroplating compositions preferably include electrolyte, i. e. acidic or alkaline electrolyte, one or more sources of metal ions, optionally halide ions, and optionally other additives like surfactants and grain refiners. Such baths are typically aqueous. The water may be present in a wide range of amounts. Any type of water may be used, such as distilled, deionized or tap.

Preferably, the plating baths of the invention are acidic, that is, they have a pH below 7. Typically, the pH of the tin or tin alloy electroplating composition is below 4, preferably below 3, most preferably below 2.

The electroplating baths of the present invention may be prepared by combining the components in any order. It is preferred that the inorganic components such as metal salts, water, electrolyte and optional halide ion source, are first added to the bath vessel followed by the organic components such as surfactants, grain refiners, levelers and the like.

Typically, the plating baths of the present invention may be used at any temperature from 10 to 65 degrees C. or higher. It is preferred that the temperature of the plating baths is from 10 to 35 degrees C. and more preferably from 15 degrees to 30 degrees C.

Suitable electrolytes include such as, but not limited to, sulfuric acid, acetic acid, fluoroboric acid, alkylsulfonic acids such as methanesulfonic acid, ethanesulfonic acid, propanesulfonic acid and trifluoromethane sulfonic acid, arylsulfonic acids such as phenyl sulfonic acid and toluenesulfonic acid, sulfamic acid, hydrochloric acid, phosphoric acid, tetraalkylammonium hydroxide, preferably tetramethylammonium hydroxide, sodium hydroxide, potassium hydroxide and the like. Acids are typically present in an amount in the range of from about 1 to about 300 g/l.

In one embodiment the at least one additive comprises a counterion $Y^{o-}$ selected from chloride, sulfate or acetate. wherein o is a positive integer.

Such electrolytes may optionally contain a source of halide ions, such as chloride ions as in tin chloride or hydrochloric acid. A wide range of halide ion concentrations may be used in the present invention such as from about 0 to about 500 ppm. Typically, the halide ion concentration is in the range of from about 10 to about 100 ppm based on the plating bath. It is preferred that the electrolyte is sulfuric acid or methanesulfonic acid, and preferably a mixture of sulfuric acid or methanesulfonic acid and a source of chloride ions. The acids and sources of halide ions useful in the present invention are generally commercially available and may be used without further purification.

Application

The plating compositions of the present invention are useful in various plating methods where a tin-containing layer is desired, and particularly for depositing a tin-containing solder layer on a semiconductor wafer comprising a plurality of conductive bonding features. Plating methods include, but are not limited to, horizontal or vertical wafer plating, barrel plating, rack plating, high speed plating such as reel-to-reel and jet plating, and rackless plating, and preferably horizontal or vertical wafer plating. A wide variety of substrates may be plated with a tin-containing deposit according to the present invention. Substrates to be plated are conductive and may comprise copper, copper alloys, nickel, nickel alloys, nickel-iron containing materials. Such substrates may be in the form of electronic components such as (a) lead frames, connectors, chip capacitors, chip resistors, and semiconductor packages, (b) plastics such as circuit boards, and (c) semiconductor wafers. Preferably the substrates are semiconductor wafers. Accordingly, the present invention also provides a method of depositing a tin-containing layer on a semiconductor wafer comprising: providing a semiconductor wafer comprising a plurality of conductive bonding features; contacting the semiconductor wafer with the composition described above; and applying sufficient electrical current to deposit the tin-containing layer on the conductive bonding features. Preferably, the bonding features comprise copper, which may be in the form of a pure copper layer, a copper alloy layer, or any interconnect structure comprising copper. Copper pillars are one preferred conductive bonding feature. Optionally, the copper pillars may comprise a top metal layer, such as a nickel layer. When the conductive bonding features have a top metal layer, then the tin or tin alloy solder layer is deposited on the top metal layer of the bonding feature. Conductive bonding features, such as bonding pads, copper pillars, and the like, are well-known in the art, such as described in U.S. Pat. No. 7,781,325, U.S. 2008/0054459 A, U.S. 2008/0296761 A, and U.S. 2006/0094226 A.

Process

One embodiment of the present invention is the use of an additive of formula L1 and any other leveler described herein in a bath for depositing tin or tin alloy containing layers, wherein the tin alloy containing layers comprise an alloy metal selected from silver, copper, indium, and bismuth in an amount of 0.01 to 10% by weight. Preferably the deposited tin alloy layer has an alloy metal content of 0.1 to 5% by weight.

Another embodiment of the present invention is a process for depositing a tin or tin alloy layer on a substrate by
a) contacting a tin alloy electroplating bath comprising a composition comprising tin ions, further alloy metal ions selected from silver, copper, indium, and bismuth ions and at least one additive of formula L1a

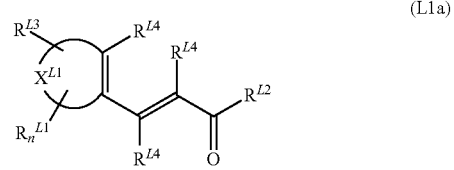

(L1a)

or of formula L1b

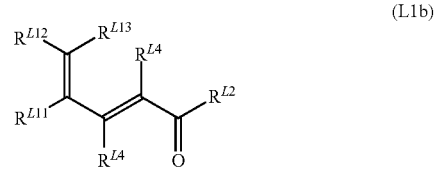

(L1b)

with the substrate, and
b) applying an electrical current to the substrate for a time sufficient to deposit the tin or tin alloy layer onto the substrate,
wherein
$R^{L1}$ is, for each group $R^{L1}n$ independently, selected from —F, a linear or branched $C_1$ to $C_6$ alkyl that comprises one or more F substituents in $C_1$ or $C_2$ position;

$R^{L2}$ is a $C_1$ to $C_6$ alkyl, $C_1$ to $C_6$ alkenyl, $C_5$ to $C_{12}$ aryl, $C_6$ to $C_{15}$ alkylaryl, $C_6$ to $C_{15}$ arylalkyl, all of which may be substituted by CN, OH, $C_1$ to $C_6$ alkoxy or halogen, particularly F;

$R^{L3}$ is selected from H, $C_1$ to $C_6$ alkyl, $C_1$ to $C_6$ alkenyl, $C_1$ to $C_6$ alkoxy or halogen, Cl, CN, and OH, preferably $R^{L1}$ or H;

$R^{L4}$ is $R^{L1}$ or $R^{L3}$;

$R^{L11}$, $R^{L12}$, $R^{L13}$ are independently selected from $R^{L1}$ and $R^{L3}$, with the condition that at least one, preferably two, most preferably all of $R^{L11}$, $R^{L12}$, $R^{L13}$ are $R^{L1}$;

$X^{L1}$ is (a) a divalent saturated, unsaturated group selected from
- (a) a $C_3$ to $C_5$ alkanediyl group,
- (b) a $C_3$ to $C_5$ alkenediyl group,
or
- (c) forms, together with the adjacent C=C double bond, a $C_5$ to $C_{12}$ aromatic ring system; and n is the number of groups $R^{L1}$ selected from 1, 2 or 3.

As used herein, "recessed feature" means a via, trench or any other opening in the substrate, particularly openings for depositing solder bumps. As used herein, "aperture size" means the shortest distance in the opening of the recessed feature.

Preferably the substrate comprises recessed features having an aperture size from 1 to 1000 micrometers and the deposition is performed to at least partially fill the micrometer sized recessed features. Most preferably the recessed features have an aperture size from 1 to 200 micrometers, preferably 3 to 100 micrometers.

In general, when the present invention is used to deposit tin or tin alloys on a substrate the plating baths are agitated during use. Preferably a tin alloy is deposited and the alloy metal content of the deposited tin alloy is from 0.01 to 10% by weight. Any suitable agitation method may be used with the present invention and such methods are well-known in the art. Suitable agitation methods include, but are not limited to, inert gas or air sparging, work piece agitation, impingement and the like. Such methods are known to those skilled in the art. When the present invention is used to plate an integrated circuit substrate, such as a wafer, the wafer may be rotated such as from 1 to 150 RPM and the plating solution contacts the rotating wafer, such as by pumping or spraying. In the alternative, the wafer need not be rotated where the flow of the plating bath is sufficient to provide the desired metal deposit.

The tin or tin alloy is deposited in recesses according to the present invention without substantially forming voids within the metal deposit. By the term "without substantially forming voids", it is meant that there are no voids in the metal deposit which are bigger than 1000 nm, preferably 500 nm, most preferably 100 nm.

Plating equipment for plating semiconductor substrates are well known. Plating equipment comprises an electroplating tank which holds tin or tin alloy electrolyte and which is made of a suitable material such as plastic or other material inert to the electrolytic plating solution. The tank may be cylindrical, especially for wafer plating. A cathode is horizontally disposed at the upper part of tank and may be any type substrate such as a silicon wafer having openings. These additives can be used with soluble and insoluble anodes in the presence or absence of a membrane or membranes separating the catholyte from the anolyte.

The cathode substrate and anode are electrically connected by wiring and, respectively, to a power supply. The cathode substrate for direct or pulse current has a net negative charge so that the metal ions in the solution are reduced at the cathode substrate forming plated metal on the cathode surface. An oxidation reaction takes place at the anode. The cathode and anode may be horizontally or vertically disposed in the tank.

In general, when preparing tin or tin alloy bumps, a photoresist layer is applied to a semiconductor wafer, followed by standard photolithographic exposure and development techniques to form a patterned photoresist layer (or plating mask) having openings or vias therein. The dimensions of the plating mask (thickness of the plating mask and the size of the openings in the pattern) defines the size and location of the tin or tin alloy layer deposited over the I/O pad and UBM.

All percent, ppm or comparable values refer to the weight with respect to the total weight of the respective composition except where otherwise indicated. All cited documents are incorporated herein by reference.

The following examples shall further illustrate the present invention without restricting the scope of this invention.

Methods Used Herein

The molecular weight of the polymeric ionic compounds was determined by size-exclusion chromatography (SEC).

Morphology (roughness) was determined by measuring the height of the substrate by laser scanning microscopy (LSM).

The patterned photoresist contained vias of 8 μm diameter and 15 μm depth and pre-formed copper μ-bump of 5 μm height. The isolated (iso)-area consists of a 3×6 array of pillars with a center to center distance (pitch) of 32 μm. The dense area consists of an 8×16 array of pillars with a center to center distance (pitch) of 16 μm.

The Average Roughness $R_a$ was calculated by using formula $$R_a = \frac{1}{n}\sum_{i=1}^{n}|H_i - H_{mean}|$$

Herein $H_i$ is the height of location i on a certain bump. During a laser scan of the surface of one bump the height of n locations is determined. $H_{mean}$ is the average height of all n locations of one bump.

EXAMPLES

The following levelers were used for the following Examples:
- Leveler 1: 4-[4-(Difluoromethyl)phenyl] but-3-en-2-one, available from Aurora Fine Chemicals;
- Leveler 2: 4-(4-(trifluoromethyl)phenyl)but-3-en-2-one, available from Merck KGaA;
- Leveler 3: 4-(4-Fluorophenyl)-but-3-en-2-one, available from Chemieliva Pharmaceuticals Co.

Comparative Example 1

A tin plating bath containing 75 g/l tin as tin methanesulfonate, 180 g/l methanesulfonic acid, 0.3 g/l of a commercial anti-oxidant and different amounts of a 1.5 g/l stock solution of benzalacetone in isopropanol was prepared.

10 μm tin was electroplated on a copper micro-bump. The copper micro-bump had a diameter of 25 μm and a height of 25 μm. A 2.5 cm×2.5 cm large wafer coupon with a 50 μm thick patterned photo resist layer has been immersed in the above described plating bath and a direct current density of 10 ASD has been applied for 300 s at 25° C. The plated tin bump was examined with a laser scanning microscope (LSM).

The results are depicted in Table 1.

Example 2

A tin plating bath as described for Comparative Example 1 containing leveler 1 instead of benzalacetone was prepared. The plating procedure was the one described in Comparative Example 1. The plated tin bump was examined with a laser scanning microscope (LSM). The results are summarized in Table 1.

Comparing the results with Comparative Example 1, tin electroplating leads to a much smoother surface when using leveler 1 compared to benzalacetone. Furthermore, the experiments with the different leveler concentrations show a broader process window for leveler 1 compared to benzalacetone.

Example 3

A tin plating bath as described for Comparative Example 1 containing leveler 2 instead of benzalacetone was prepared. The plating procedure was the one described in Comparative Example 1. The plated tin bump was examined with a laser scanning microscope (LSM).

The results are summarized in Table 1.

Comparing the results with Comparative Example 1, tin electroplating leads to a much smoother surface when using leveler 2 compared to benzalacetone. Furthermore, the experiments with the different leveler concentrations show a much broader process window for leveler 2 compared to benzalacetone, particularly for lower concentrations.

Example 4

A tin plating bath as described for Comparative Example 1 containing leveler 3 instead of benzalacetone was prepared. The plating procedure was the one described in Comparative Example 1. The plated tin bump was examined with a laser scanning microscope (LSM).

The results are summarized in Table 1.

Comparing the results with Comparative Example 1, tin electroplating leads to a much smoother surface when using leveler 3 compared to benzalacetone. Furthermore, the experiments with the different leveler concentrations show a broader process window for leveler 3 compared to benzalacetone.

TABLE 1

| Example | Leveler | Leveler dosing [ml/l] | $R_a$ [µm] |
|---|---|---|---|
| Comp. 1 | Benzalacetone | 20 | 1.19 |
|  |  | 30 | 0.81 |
|  |  | 60 | 0.65 |
| 2 | Leveler 1 | 30 | 0.48 |
|  |  | 60 | 0.32 |
| 3 | Leveler 2 | 20 | 0.47 |
|  |  | 30 | 0.26 |
|  |  | 60 | 0.52 |
|  |  | 29 | 0.43 |
|  |  | 44 | 0.39 |
|  |  | 88 | 0.42 |
| 4 | Leveler 3 | 30 | 0.42 |
|  |  | 60 | 0.39 |

The invention claimed is:

1. An aqueous composition comprising tin ions, optionally alloy metal ions selected from the group consisting of silver, indium, and bismuth ions and at least one additive of formula L1a

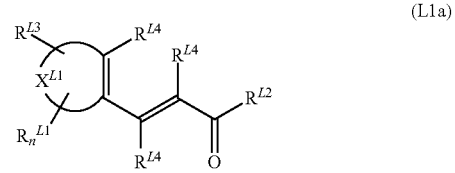

(L1a)

or of formula L1b

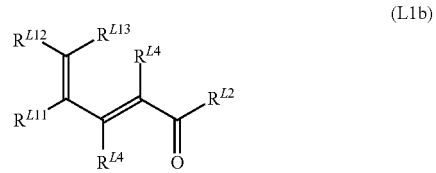

(L1b)

wherein
$R^{L1}$ is, for each group $R^{L1}$, independently, selected from the group consisting of —F and a linear or branched $C_1$ to $C_6$ alkyl that comprises one or more F substituents in $C_1$ or $C_2$ position;
$R^{L2}$ is a $C_1$ to $C_6$ alkyl, $C_1$ to $C_6$ alkenyl, $C_5$ to $C_{12}$ aryl, $C_6$ to $C_{15}$ alkylaryl, $C_6$ to $C_{15}$ arylalkyl, all of which may be substituted by CN, OH, $C_1$ to $C_6$ alkoxy or halogen;
$R^{L3}$ is selected from the group consisting of H, $C_1$ to $C_6$ alkyl, $C_1$ to $C_6$ alkenyl, $C_1$ to $C_6$ alkoxy, halogen, CN, and OH;
$R^{L4}$ is, for each $R^{L4}$ independently, selected from the group consisting of $R^{L1}$ and $R^{L3}$;
$R^{L11}$, $R^{L12}$, $R^{L13}$ are independently selected from the group consisting of $R^{L1}$ and $R^{L3}$, with the condition that at least two of $R^{L11}$, $R^{L12}$, $R^{L13}$ are $R^{L1}$; and
$X^{L1}$ is
  (a) a divalent group selected from the group consisting of
    (i) a $C_3$ to $C_5$ alkanediyl, and
    (ii) a $C_3$ to $C_5$ alkenediyl,
  or
  (b) forms, together with the adjacent C=C double bond, a C5 to $C_{12}$ aromatic ring system; and
n is the number of groups $R^{L1}$ selected from the group consisting of 1, 2 and 3;
wherein the at least one additive is a fluorinated leveler capable of providing a substantially planar tin or tin alloy layer and filling features on the micrometer scale without substantially forming defects.

2. The composition according to claim 1, wherein $R^{L1}$ is selected from the group consisting of —F, —$CR^{L3}_2$F, —$CR^{L3}F_2$, and —$CF_3$, wherein $R^{L3}$ is selected from the group consisting of H and $C_1$ to $C_6$ alkyl.

3. The composition according to claim 1, wherein $R^{L1}$ is selected from the group consisting of —F, and —$CF_3$.

4. The composition according to claim 1, wherein $R^{L2}$ is selected from the group consisting of methyl, ethyl, 1-propyl, 2-propyl, tert. butyl, and benzylidene, which may be unsubstituted or substituted by F or CN.

5. The composition according to claim 1, wherein the at least one additive is a compound of formula L2a

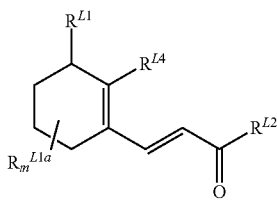
(L2a)

or of formula L2b

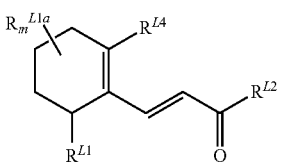
(L2b)

wherein
$R^{L1a}$ selected from the group consisting of $R^{L1}$, Cl, Br, and $C_1$ to $C_6$ alkyl, which alkyl may be unsubstituted or substituted by F, CN, Cl and Br, and
m is 0, 1, 2, or 3, or 4.

6. The composition according to claim 1, wherein the at least one additive is a compound of formula L3

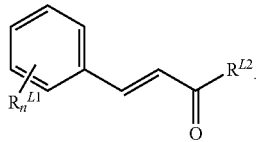
(L3)

7. The composition according to claim 1, wherein the at least one additive is a compound of formula L3a

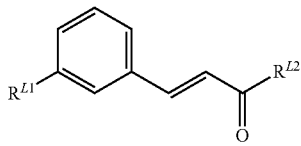
(L3a)

or of formula L3b

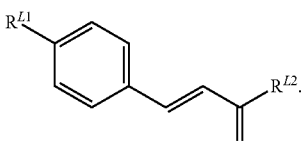
(L3b)

8. The composition according to claim 1, wherein the alloy metal ions comprise silver ions.

9. The composition according to claim 1, wherein the pH of the composition is below 4.

10. The composition according to claim 1, further comprising a further additive selected from the group consisting of one or more surfactants and one or more grain refiners, wherein the one or more grain refiners are different from the at least one additive.

11. A method of using the at least one additive of formula L1a or L1b of claim 1, the method comprising adding the at least one additive of formula L1a or L1b to a bath for depositing tin or tin alloy containing layers, wherein the tin alloy containing layers comprise an alloy metal selected from the group consisting of silver, copper, indium, and bismuth in an amount of 0.01 to 10% by weight,

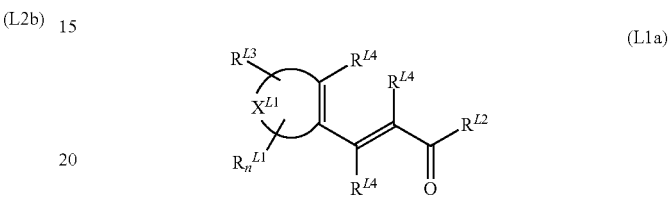
(L1a)

or of formula L1b

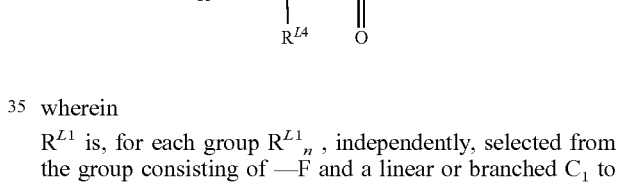
(L1b)

wherein
$R^{L1}$ is, for each group $R^{L1}{}_n$, independently, selected from the group consisting of —F and a linear or branched $C_1$ to $C_6$ alkyl that comprises one or more F substituents in $C_1$ or $C_2$ position;

$R^{L2}$ is a $C_1$ to $C_6$ alkyl, $C_1$ to $C_6$ alkenyl, $C_5$ to $C_{12}$ aryl, $C_6$ to $C_{15}$ alkylaryl, $C_6$ to $C_{15}$ arylalkyl, all of which may be substituted by CN, OH, $C_1$ to $C_6$ alkoxy or halogen;

$R^{L3}$ is selected from the group consisting of H, $C_1$ to $C_6$ alkyl, $C_1$ to $C_6$ alkenyl, $C_1$ to $C_6$ alkoxy, halogen, CN, and OH;

$R^{L4}$ is, for each $R^{L4}$ independently, selected from the group consisting of $R^{L1}$ and $R^{L3}$, $R^{L11}$, $R^{L12}$, $R^{L13}$ are independently selected from the group consisting of $R^{L1}$ and $R^{L3}$, with the condition that at least two of $R^{L11}$, $R^{L12}$, $R^{L13}$ are $R^{L1}$, and $X^{L1}$ is
(a) a divalent group selected from the group consisting of
(i) a $C_3$ to $C_5$ alkanediyl, and
(ii) a $C_3$ to $C_5$ alkenediyl,
or
(b) forms, together with the adjacent C=C double bond, a $C_5$ to $C_{12}$ aromatic ring system; and
n is the number of groups RLI selected from the group consisting of 1, 2 and 3;
wherein the at least one additive is a fluorinated leveler capable of providing a substantially planar tin or tin alloy layer and filling features on the micrometer scale without substantially forming defects.

12. The method according to claim 11, wherein the deposited tin alloy layer has an alloy metal content of 0.1 to 5% by weight.

13. A process for depositing a tin or tin alloy layer on a substrate by
   a) contacting a tin alloy electroplating bath comprising a composition according to claim 1 with the substrate, and
   b) applying an electrical current to the substrate for a time sufficient to deposit the tin or tin alloy layer onto the substrate.

14. The process according to claim 13, wherein a tin alloy is deposited and the alloy metal content of the deposited tin alloy is from 0.01 to 10% by weight.

15. The process according to claim 13, wherein the substrate comprises recessed features having an aperture size from 1 to 1000 micrometers, and the deposition is performed to at least partially fill the micrometer sized recessed features.

16. The composition according to claim 1, wherein $R^{L11}$, $R^{L12}$, $R^{L13}$ are independently selected from the group consisting of $R^{L1}$ and $R^{L3}$, with the condition that all of $R^{L11}$, $R^{L12}$, $RL^{13}$ are $R^{L1}$.

17. The composition according to claim 1, wherein $R^{L2}$ is selected from the group consisting of methyl, ethyl, ethenyl, and benzylidene, which may be unsubstituted or substituted by F or CN.

18. The composition according to claim 1, wherein the at least one additive is a compound of formula L2a

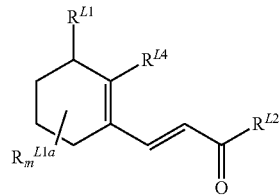

or of formula L2b

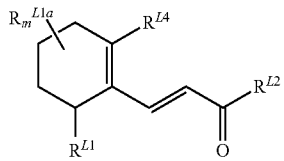

wherein
$R^{L1a}$ selected from the group consisting of $R^{L1}$, Cl, Br, and $C_1$ to $C_3$ alkyl, which alkyl may be unsubstituted or substituted by F, CN, Cl and Br; and
m is 0 or 1.

19. The composition according to claim 1, wherein the composition does not comprise additional levelers.

* * * * *